United States Patent
Yoshida

(10) Patent No.: US 12,164,816 B2
(45) Date of Patent: Dec. 10, 2024

(54) JOB PROCESSING APPARATUS FOR DISPLAYING SCREEN ACCORDING TO JOB EXECUTION STATUS AND DISPLAY METHOD THEREOF

(71) Applicant: SHARP KABUSHIKI KAISHA, Sakai (JP)

(72) Inventor: Mayuko Yoshida, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 18/235,598

(22) Filed: Aug. 18, 2023

(65) Prior Publication Data
US 2024/0069820 A1    Feb. 29, 2024

(30) Foreign Application Priority Data

Aug. 29, 2022  (JP) .................................. 2022-136180

(51) Int. Cl.
*G06F 3/12* (2006.01)
(52) U.S. Cl.
CPC .......... *G06F 3/1207* (2013.01); *G06F 3/1222* (2013.01); *G06F 3/1238* (2013.01); *G06F 3/1259* (2013.01); *G06F 3/1273* (2013.01)
(58) Field of Classification Search
None
See application file for complete search history.

(56) References Cited

U.S. PATENT DOCUMENTS

| | | | | |
|---|---|---|---|---|
| 2014/0082137 A1* | 3/2014 | Matoba | ................ | H04L 67/02 709/217 |
| 2015/0055172 A1* | 2/2015 | Lida | ................ | G06K 15/4065 358/1.15 |
| 2019/0042167 A1* | 2/2019 | Yamada | ................ | G06F 3/1207 |
| 2019/0278542 A1* | 9/2019 | Iida | ................ | H04N 1/4486 |
| 2019/0306349 A1* | 10/2019 | Shino | ................ | H04N 1/00482 |
| 2020/0042258 A1* | 2/2020 | Kusakabe | ............ | G06F 3/1288 |
| 2020/0097226 A1* | 3/2020 | Niiyama | ............... | G06F 3/1234 |
| 2021/0173598 A1* | 6/2021 | Nagai | ................ | G06F 3/1238 |
| 2022/0070318 A1* | 3/2022 | Ogino | ................ | H04N 1/0097 |
| 2022/0137906 A1* | 5/2022 | Ogawa | ............... | G06K 15/1809 358/1.15 |
| 2022/0377203 A1* | 11/2022 | Ebi | ................ | H04N 1/0097 |
| 2023/0112103 A1* | 4/2023 | Ido | ................ | H04N 1/0048 358/1.15 |
| 2023/0120274 A1* | 4/2023 | Nagao | ................ | H04N 1/4413 358/1.15 |
| 2023/0199129 A1* | 6/2023 | Noda | ................ | H04N 1/00482 358/1.13 |
| 2023/0262174 A1* | 8/2023 | Maruyama | ......... | H04N 1/00411 358/1.13 |

FOREIGN PATENT DOCUMENTS

JP    2000-029644 A    1/2000

* cited by examiner

*Primary Examiner* — Henok Shiferaw
(74) *Attorney, Agent, or Firm* — ScienBiziP, P.C.

(57) ABSTRACT

According to an embodiment, a job processing apparatus includes one or more controllers which control execution of a registered job, and a display which allows a status of execution of the job to be displayed on a screen, and the one or more controllers display the status of execution of the job on the screen when the job is being executed, and displays a history of execution of the job on the screen when execution of the job that has been registered is completed.

9 Claims, 17 Drawing Sheets

FIG. 3A

| JOB MANAGEMENT TABLE | | | | | | |
|---|---|---|---|---|---|---|
| JOB ID | SET TIME | JOB TYPE | USER NAME | NUMBER OF SETS | IMAGE DATA | STATUS |
| 0101 | 2020/04/01 14:10 | COPY | User_1 | 0200 | /MFP/ADF/003256789.jpg | WAITING |
| 0100 | 2020/04/01 14:05 | COPY | User_1 | 0200 | /MFP/ADF/003256765.pdf | COPYING |
| ⋮ | ⋮ | ⋮ | ⋮ | ⋮ | ⋮ | ⋮ |

FIG. 3B

| JOB HISTORY TABLE | | | | | |
|---|---|---|---|---|---|
| HISTORY ID | JOB ID | SET TIME | JOB TYPE | USER NAME | STATUS |
| 0099 | 0099 | 2020/04/01 13:55 | COPY | User_1 | OK |
| 0098 | 0098 | 2020/04/01 13:31 | COPY | User_1 | OK |
| 0097 | 0097 | 2020/04/01 13:30 | PRINT | User_1 | OK |
| 0096 | 0096 | 2020/04/01 13:25 | PRINT | User_2 | OK |
| 0095 | 0095 | 2020/04/01 13:23 | PRINT | User_1 | OK |
| 0094 | 0094 | 2020/04/01 11:42 | PRINT | User_3 | OK |
| 0093 | 0093 | 2020/04/01 10:40 | PRINT | User_2 | OK |
| 0092 | 0092 | 2020/04/01 10:30 | PRINT | User_1 | OK |
| 0091 | 0091 | 2020/04/01 10:07 | COPY | User_3 | OK |
| ⋮ | ⋮ | ⋮ | ⋮ | ⋮ | ⋮ |

FIG. 9

JOB PROCESSING APPARATUS FOR DISPLAYING SCREEN ACCORDING TO JOB EXECUTION STATUS AND DISPLAY METHOD THEREOF

BACKGROUND OF THE INVENTION

Field of the Invention

The present disclosure relates to, for example, a job processing apparatus.

Description of the Background Art

For example, job processing apparatuses which register jobs such as printing, copying, scanning, faxing, or Internet Fax transmission, and manage the registered jobs as queues are known.

In such a job processing apparatus, queues are displayed on a screen in the form of a job list representing the status execution of jobs, such as spooling, reserved/executing, and completed (the screen may be hereinafter referred to as a job list screen). The user can ascertain the status of execution of the job that has been registered by referring to the job list screen.

For example, as a conventional technology, an image forming apparatus which enables the display contents of a job list screen to be switched manually is known.

With a configuration of the conventional technology, a user is required to manually switch the job list screen related to "reserved/executing" in order to ascertain the reservation status and execution status of the jobs, so that it is difficult to ascertain the reservation status and execution status of the jobs at an appropriate timing.

In view of such circumstances, an object of the present disclosure is to provide a job processing apparatus and the like which can display a job list screen at an appropriate timing according to the status of job execution, and by which the job list screen to be displayed is as desired by the user.

SUMMARY OF THE INVENTION

In order to solve the above problem, a job processing apparatus according to the present disclosure includes one or more controllers which control execution of a registered job, and a display which allows a status of execution of the job to be displayed on a screen, and the job processing apparatus is characterized in that the one or more controllers display the status of execution of the job on the screen when the job is being executed, and displays a history of execution of the job on the screen when execution of the job that has been registered is completed.

Further, the job processing apparatus according to the present disclosure includes one or more controllers which control execution of a registered job, a job detector which detects execution of the job, and a display which allows a status of execution of the job to be displayed on a screen, and the job processing apparatus is characterized in that the one or more controllers switch display contents of the screen according to the status of execution of the job that has been registered, based on a result of detection of the execution of the job.

Furthermore, a display method according to the present disclosure pertains to a display method comprising controlling execution of a registered job, and displaying a status of execution of the job on a screen, and the display method is characterized by displaying the status of execution of the job on the screen when the job is being executed, and displaying a history of execution of the job on the screen when execution of the job that has been registered is completed.

According to the present disclosure, it is possible to provide a job processing apparatus and the like which can display a job list screen at an appropriate timing according to the status of job execution, and by which the job list screen to be displayed is as desired by the user.

BRIEF DESCRIPTION OF THE DRAWINGS

FIG. 3A is a diagram illustrating a job management table, and FIG. 3B is a diagram illustrating a job history table.

FIG. 9 is a diagram illustrating an operation example according to the first embodiment.

DESCRIPTION OF THE PREFERRED EMBODIMENTS

Embodiments of the present disclosure will be described below with reference to the accompanying drawings. In the present disclosure, a multifunction peripheral that can perform a job based on each function of printing, copying, scanning, faxing, or Internet Fax, and the like, in a single housing, for example, will be described as one form of a job processing apparatus. The embodiments described below are presented as examples for explaining the present disclosure, and the technical scope of the embodiments as recited in the appended claims is not limited by the following description.

1. First Embodiment

A first embodiment corresponds to an embodiment which is provided with a controller which controls execution of a registered job, and a display which allows a status of execution of the job to be displayed on a screen, in which the controller displays the status of execution of the job on the screen when the job is being executed, and displays a history of execution of the job when execution of the job that has been registered is completed.

1.1 Functional Configuration

Figure 1:
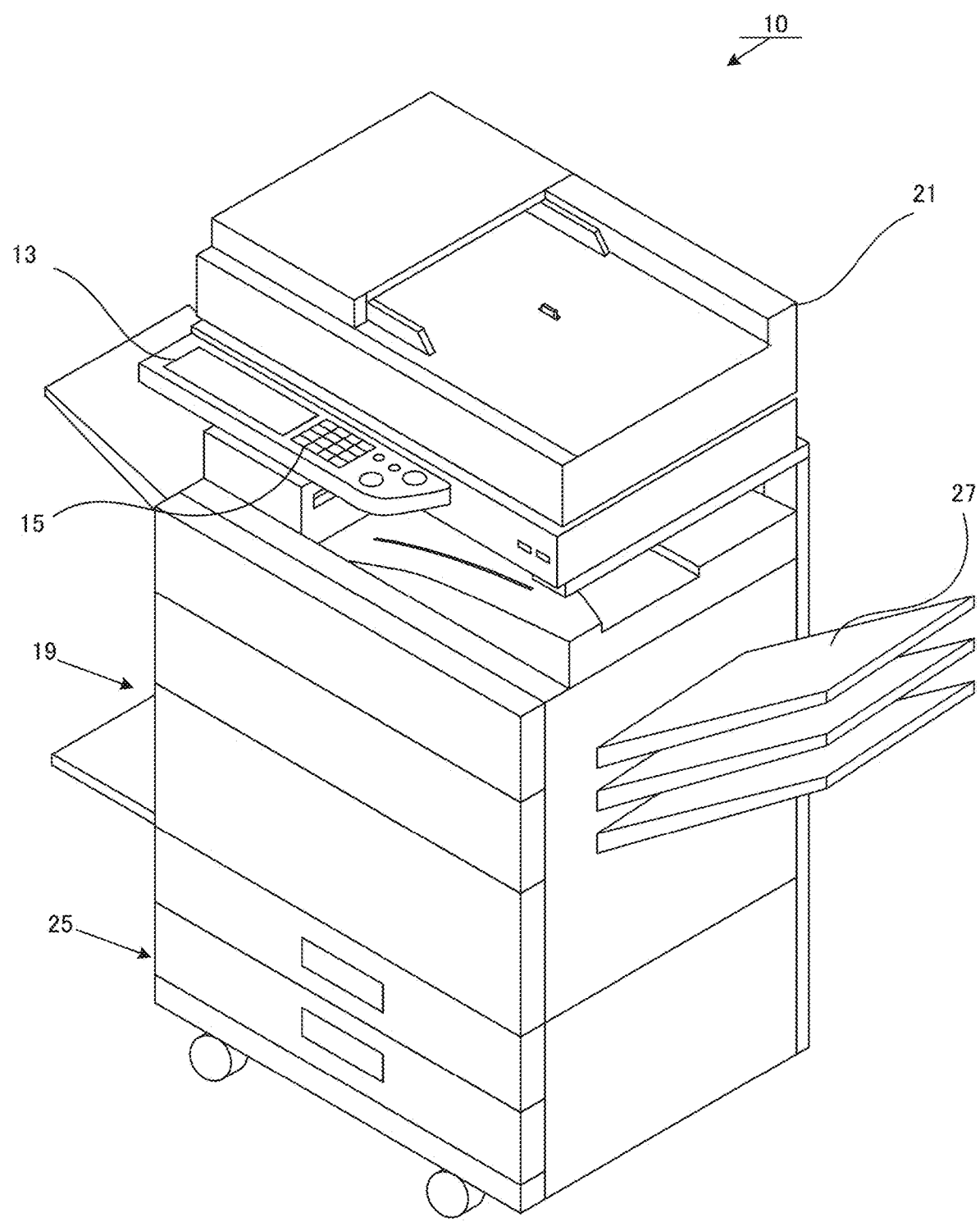
FIG. 1 is an external perspective view of a multifunction peripheral according to a first embodiment.
Figure 2:
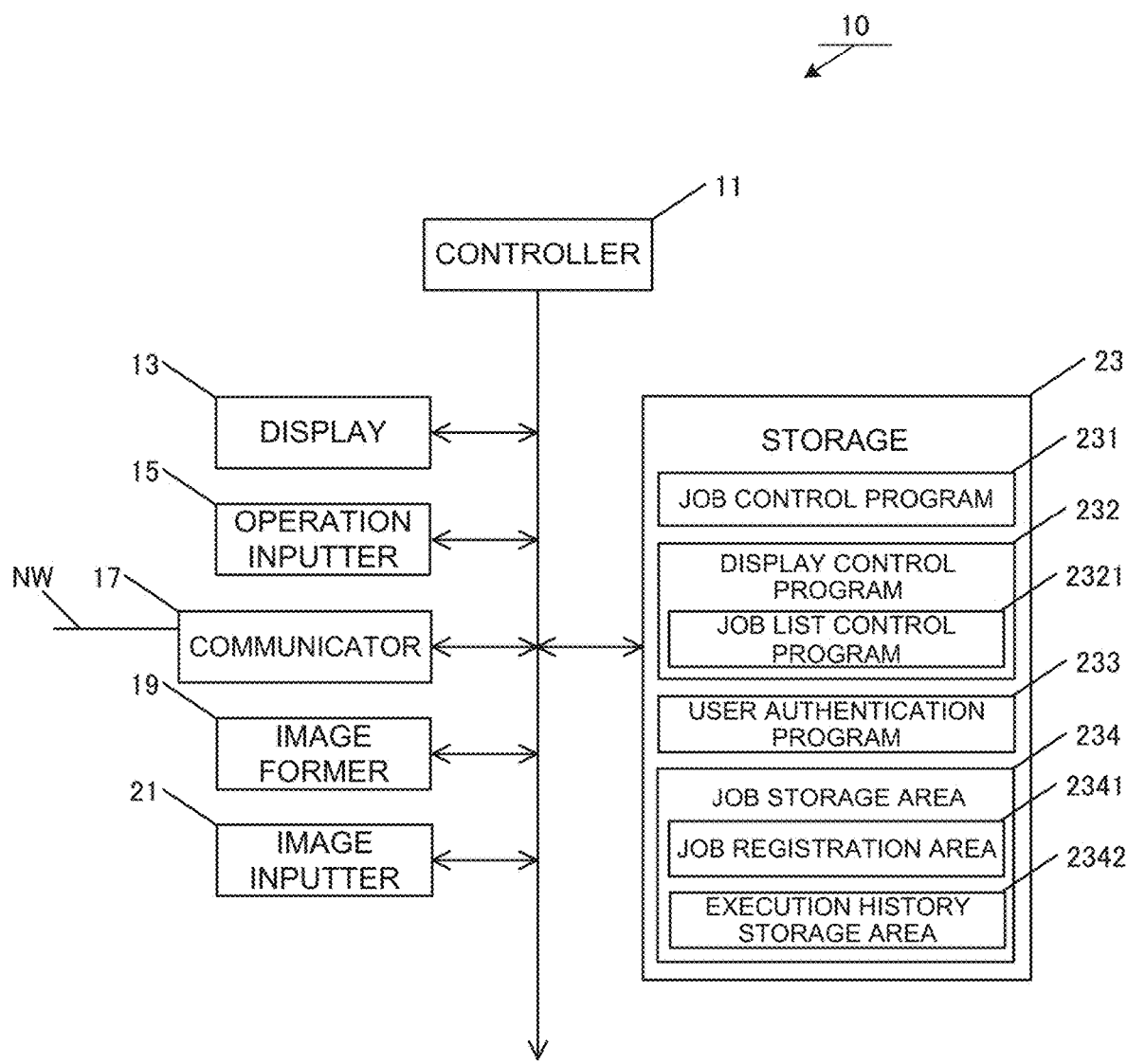
FIG. 2 is a functional configuration diagram of the multifunction peripheral according to the first embodiment.

A functional configuration of a multifunction peripheral 10 according to the first embodiment will be described with reference to FIGS. 1 and 2. FIG. 1 is an external perspective view which schematically illustrates an overall configuration of the multifunction peripheral 10. FIG. 2 is a functional configuration diagram of the multifunction peripheral 10. The multifunction peripheral 10 is provided with a controller 11, a display 13, an operation inputter 15, a communicator 17, an image former 19, an image inputter 21, and a storage 23.

The controller 11 controls the multifunction peripheral 10 as a whole. The controller 11 is composed of, for example, one or more arithmetic devices (such as central processing units [CPUs]). The controller 11 reads and executes various programs stored in the storage 23, thereby implementing functions thereof.

The display 13 displays various kinds of information to a user or the like. The display 13 can be composed of, for example, a liquid crystal display (LCD) or an organic electro-luminescence (EL) display. The display 13 can display a job list screen on the basis of control by the controller 11 that has read a display control program 232 to be described later.

The operation inputter 15 receives input of information from the user or the like. The operation inputter 15 can be configured from, for example, a hard key (e.g., a numeric keypad), buttons, and the like. The operation inputter 15 can be configured as a touch panel that allows input to be made via the display 13. In this case, for example, a common method such as a resistive method, an infrared method, an electromagnetic induction method, or a capacitive sensing method may be employed as an input method for the touch panel.

The communicator 17 is provided with either of or both of wired and wireless interfaces to communicate with another device via a network (NW) such as a local area network (LAN), a wide area network (WAN), the Internet, a telephone line, or a fax line.

The image former 19 forms, on a sheet of paper as a recording medium, an image based on image data. The image former 19 feeds paper from a paper feeder 25, forms an image based on the image data on the paper, and thereafter discharges the paper to a paper discharger 27. The image former 19 can be composed of, for example, a laser printer using an electrophotographic method. In this case, the image former 19 forms an image by using toners supplied from toner cartridges, which are not illustrated, corresponding to respective toner colors (e.g., cyan, magenta, yellow, and black).

The image inputter 21 scans and reads a document, thereby generating image data. The image inputter 21 can be configured, for example, as a scanner device provided with an image sensor, such as a charge-coupled device (CCD), a contact image sensor (CIS), or the like, and including an automatic document feeder (ADF). As long as the image inputter 21 is configured to generate image data by reading a reflected light image from a document image by using the image sensor, a configuration thereof is not limited. In the present disclosure, the image inputter 21 can also be configured as an interface which can acquire, for example, image data stored in a portable storage medium such as a Universal Serial Bus (USB) memory, or image data transmitted from an external device (not illustrated) via the communicator 17.

The storage 23 stores therein various kinds of data and various programs necessary for operation of the multifunction peripheral 10. The storage 23 can be configured from, for example, storage devices such as a random-access memory (RAM), a hard disk drive (HDD), a solid state drive (SSD), and a read-only memory (ROM).

In the first embodiment, the storage 23 stores a job control program 231, the display control program 232, and a user authentication program 233, and reserves a job storage area 234.

The job control program 231 is a program that the controller 11 reads in order to perform processing associated with execution of each function of printing, copying, scanning, faxing, Internet Fax, and the like, on a job-by-job basis. The controller 11 that has read the job control program 231 executes a job by controlling the display 13, the operation inputter 15, the communicator 17, the image former 19, the image inputter 21, and the like.

The display control program 232 is a program that the controller 11 reads in controlling a display screen to be displayed via the display 13. The controller 11 that has read the display control program 232 can display, on the display 13, a setting screen (not illustrated) for receiving input of various setting values pertaining to job execution, a home screen which receives a switching instruction for each operation mode, etc., a login screen for user authentication, and the like. Also, the display control program 232 includes a job list control program 2321. The controller 11 that has read the job list control program 2321 performs determination processing necessary for displaying a job list screen and display control. For example, when user authentication is enabled, the controller 11 that has read the job list control program 2321 switches the display of the job list screen according to the status of execution of the job registered by the authenticated user.

The user authentication program 233 is a program that the controller 11 reads in authenticating a user attempting to log into the multifunction peripheral 10. The controller 11 that has read the user authentication program 233 functions as an authenticator. When a user authentication function is enabled, the controller 11 displays the login screen on the display 13 and receives input of a login user name and a login password. The controller 11 stores the login user name and the login password pertaining to user authentication to be associated with each other in advance and can perform login authentication of the user by verifying the login user name and the login password that have been input via the login screen. In addition to knowledge authentication based on the input of the login user name and the login password, the login authentication can also be performed by, for example, possession authentication using a token, a key, an integrated circuit (IC) card, a smartphone, and the like, or biometric authentication such as face authentication and fingerprint authentication. The controller 11 can determine whether the user authentication function is enabled or disabled based on the setting contents set via the setting screen (not illustrated).

The job storage area 234 includes a job registration area 2341 for registering and managing jobs to be executed, and an execution history storage area 2342 which stores histories of execution of the jobs as job history. The job registration area 2341 manages the jobs pertaining to printing, copying, scanning, faxing, or Internet Fax, and the like, on the basis of a job management table. Also, the execution history storage area 2342 manages the histories of execution of the jobs that have been executed on the basis of a job history table.

Here, the job management table and the job history table will be described with reference to FIGS. 3A and 3B. FIG. 3A is a table illustrating a configuration example of a data structure of the job management table. FIG. 3B is a table illustrating a configuration example of a data structure of the job history table. In FIGS. 3A and 3B, a job pertaining to printing including copying (i.e., a print job) will be described as an example of a job type.

The job management table illustrated in FIG. 3A includes, as management items, Job ID, Set time, Job type, User name, Number of sets, Image data, and Status. Job ID is an identifier to uniquely identify the registered job. Set time indicates the time when the job has been set. In this case, the Set time can be the time when an instruction to execute a copy job has been input, or the Set time may alternatively be the time when a document to be copied has been set to the image inputter 21 (e.g., the scanner device). Job type indicates the type of the job in question. User name indicates the name of a user who has executed the job. If the user who has executed the job is uncertain (e.g., a job of making a small number of copies by directly operating the multifunction peripheral 10), this management item may be left blank. Number of sets indicates the number of copies to be made. Image data indicates a storage location (a file path) of the image data for use as an original image of the copy. Status indicates the status of execution of the job in question by indicating "waiting" or "copying", for example.

For example, a job identified as "0101" by the job ID indicates that the job corresponds to a copy job pertaining to the job type "copy", which has been set at the set time "2020/04/01 14:10". The aforementioned copy job is an example in which 200 copies are set (Number of sets: "0200") by the user with the user name "User 1", by using the image data "/MFP/ADF/003256789.jpg" as the original image of the copy. Further, the status of the copy job pertaining to job ID "0101" is "waiting".

The job history table illustrated in FIG. 3B includes, as history items, History ID, Job ID, Set time, Job type, User name, and Status. History ID is generated each time a job is executed (completed), and is an identifier to uniquely identify each job history. Job ID is an identifier to uniquely identify the registered job, and the Job ID is an identifier which is the same as the identifier of the job ID related to FIG. 3A. FIG. 3B shows an example of the case in which the history ID and the job ID take on the same identifier value. However, it is of course acceptable if the history ID and the job ID take on different identifier values as in the case in which, for example, the order of registration of jobs (job ID) and the order of execution of the jobs (history ID) are different. Set time indicates the time when the job has been set, and is identical to the Set time related to FIG. 3A. In terms of the values, Job type and User name are also identical to the Job type and the User name exemplified in FIG. 3A. Status indicates the status of execution of the job in question by indicating, for example, "OK" meaning that the job is completed.

For example, a job history identified by history ID "0099" (Job ID "0099") indicates that the job corresponds to a copy job pertaining to the job type "copy", which has been set at the set time "2020/04/01 13:55". The aforementioned copy job is set by the user with the user name "User_1", and the status of the copy job pertaining to this history ID "0099" is "OK".

The controller 11 that has read the job list control program 2321 generates, on the basis of the management items of the job management table and the history items of the job history table, the job list screen including queues of the corresponding jobs as the display contents.

1.2 Flow of Processing

Figure 4:
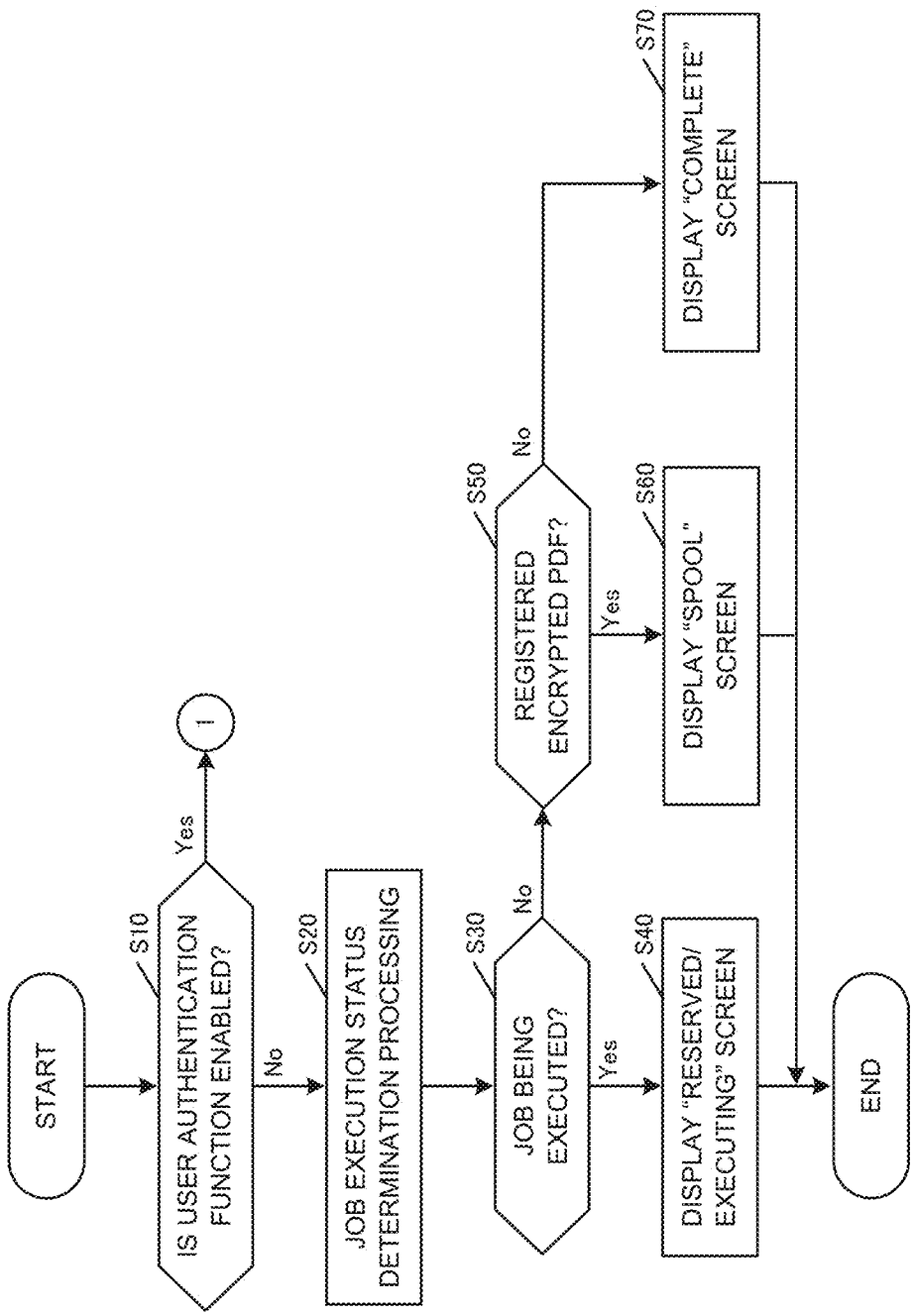
FIG. 4 is a flowchart illustrating a flow of processing according to the first embodiment.
Figure 5:
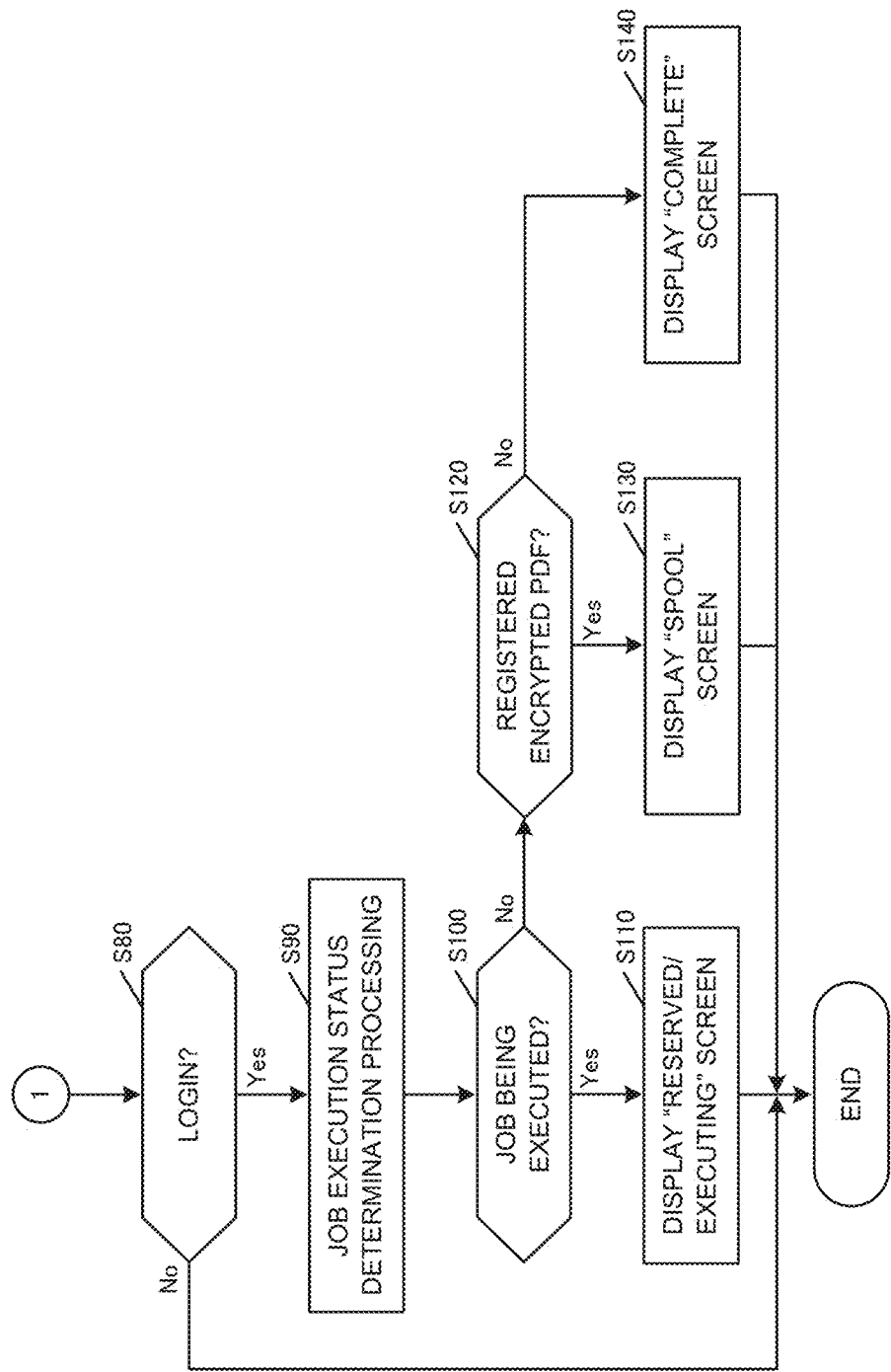
FIG. 5 is a flowchart illustrating a flow of processing according to the first embodiment.

Next, a flow of processing of the first embodiment will be described with reference to the flowcharts of FIGS. 4 and 5. The processing described with reference to FIGS. 4 and 5 is that executed by the controller 11 as the controller 11 reads the job control program 231, the display control program 232, more particularly, the job list control program 2321, and the user authentication program 233. In FIGS. 4 and 5, a job pertaining to copying and printing will be described as an example of the job.

First, the controller 11 determines whether the user authentication function is enabled (step S10). If the controller 11 determines that the user authentication function is disabled, the controller 11 performs job execution status determination processing (step S10; No→step S20). In this case, the controller 11 can determine the job execution status by referring to the item "Status" in the job management table or the job history table.

As a result of the determination of the job execution status, if it is determined that job execution is in progress, the controller 11 displays a "Reserved/Executing" screen as the job list screen, and ends the processing (step S30; Yes→step S40). If the user authentication function is disabled and a job is being executed, the controller 11 displays queues corresponding to the jobs managed in the job management table in the order of registration of the jobs. The user can thereby easily ascertain the job being executed.

Meanwhile, if it is determined that job execution is not in progress, the controller 11 determines whether there exists a print job pertaining to a pre-registered encrypted Portable Document Format (PDF) (step S30; No→step S50). Here, the encrypted PDF refers to a PDF encrypted such that the user is required to enter a password when viewing or editing the PDF file in question, or outputting the PDF file in question as a printed material, for example, with the aim of enhancing security, and in order to prevent falsification of data or information leakage, etc., by an outsider. In other words, once an encrypted PDF is registered as a print job, it is virtually impossible to execute the print job until a password to decrypt the encrypted PDF is entered.

Therefore, if it is determined in step S50 that a print job pertaining to a pre-registered encrypted PDF exists, the controller 11 displays a "Spool" screen as the job list screen so that decryption processing or deletion processing for the encrypted PDF can be performed (step S50; Yes→step S60).

Meanwhile, if it is determined that there exists no print job pertaining to a pre-registered encrypted PDF, and not a single print job is registered, the controller 11 displays a "Complete" screen as the job list screen (step S50; No→step S70). Since the user authentication function is disabled in the above case, the controller 11 displays all of the queues managed in the job history table in the order of registration. Therefore, the user can easily ascertain the jobs that have been completed in the multifunction peripheral 10, and can simply carry out an operation again for a job using the queue pertaining to the executed job.

Incidentally, if the controller 11 determines that the user authentication function is enabled, the controller 11 determines whether a user has logged into the multifunction peripheral 10 (step S10; Yes→step S80). If the controller 11 determines that a user has logged into the multifunction peripheral 10, the controller 11 performs job execution status determination processing (step S80; Yes→step S90). Meanwhile, if it is determined that no user has logged into the multifunction peripheral 10, the controller 11 ends the processing (step S80; No→End).

As a result of the determination of the job execution status, if it is determined that job execution is in progress, the controller 11 displays a "Reserved/Executing" screen as the job list screen, and ends the processing (step S100; Yes→step S110). When the user authentication function is enabled and a job is being executed, the controller 11 displays queues corresponding to the jobs registered by the user logging into the multifunction peripheral 10. Therefore, the user can easily ascertain the status of execution of the jobs registered by the user himself/herself.

Meanwhile, if it is determined that job execution is not in progress, the controller 11 determines whether there exists a print job pertaining to a pre-registered encrypted Portable Document Format (PDF) (step S100; No→step S120).

If it is determined in step S120 that a print job pertaining to a pre-registered encrypted PDF exists, the controller 11 displays a "Spool" screen as the job list screen so that decryption processing or deletion processing of the encrypted PDF can be performed (step S120; Yes→step S130). Incidentally, when a print job pertaining to an encrypted PDF is registered by another user different from the user who has logged into the multifunction peripheral 10, the controller 11 does not display a "Spool" screen as the job list screen. With such a configuration, there is no risk of a user logging into the multifunction peripheral 10 accidentally manipulating the encrypted PDF registered by another user. When such another user logs into the multifunction peripheral 10, a "Spool" screen on which the encrypted PDF can be manipulated can be displayed.

If it is determined that there exists no print job pertaining to a pre-registered encrypted PDF, and not a single print job is registered, the controller 11 displays a "Complete" screen as the job list screen (step S120; No→step S140) Since the user authentication function is enabled in the above case, only the queues corresponding to jobs that are registered by the user logging into the multifunction peripheral 10 as execution jobs, and are managed in the job history table are displayed. Therefore, the user can easily ascertain the jobs of the user that have been completed, and can simply carry out an operation again for a job using the queue pertaining to the executed job.

1.3 Operation Examples

Figure 6:
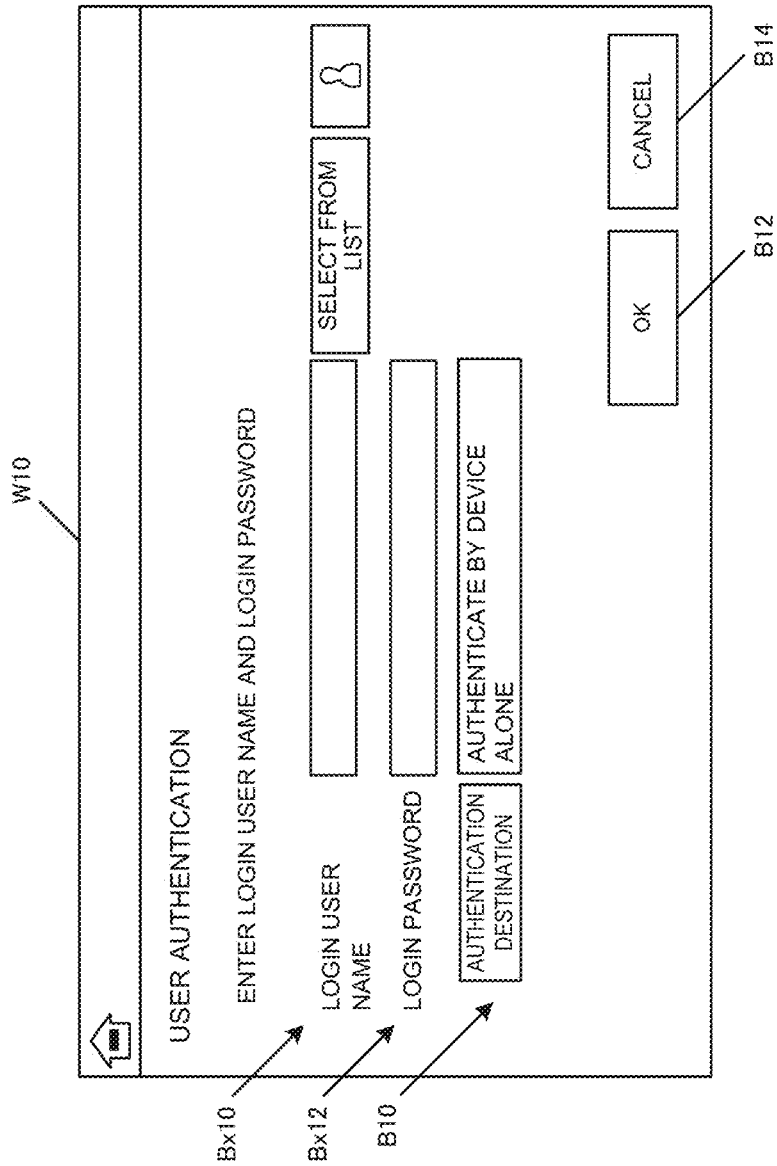
FIG. 6 is a diagram illustrating an operation example according to the first embodiment.

Next, an operation example of the first embodiment will be described. FIG. 6 is a diagram illustrating a configuration example of a user authentication screen W10 that the controller 11 displays on the display 13. The user authentication screen W10 can be configured as a login screen to be displayed on the display 13 by the controller 11 that has read the user authentication program 233, when the user authentication function is enabled.

The user authentication screen W10 includes a login user name input box Bx10, a login password input box Bx12, an authentication destination specifying button B10, an OK button B12, and a cancel button B14.

The login user name input box Bx10 receives input of a login user name of a user who attempts to log into the multifunction peripheral 10. The login user name may be input directly by using an input device such as a keyboard, or can alternatively be input by selecting the login user name from a user name list displayed by pressing of a "Select from List" button that is provided separately.

The login password input box Bx12 is an input box which receives input of a login password corresponding to the login user name. The user attempting to log into the multifunction peripheral 10 enters the login password together with the input of the login user name.

The authentication destination specifying button B10 is a button which receives specification of a user authentication destination. The user authentication destination may be set to the device alone, or an authentication server or the like separately provided on a network (NW), for example, can be specified as the user authentication destination. When the device alone is specified as the user authentication destination, the controller 11 authenticates the user by comparing the entered login user name and login password with authentication information prepared in advance (e.g., a combination of the user name and the password). Meanwhile, when the authentication server provided on the NW is specified as the user authentication destination, the controller 11 transmits the entered login user name and login password to the authentication server and receives an authentication result from the authentication server, thereby authenticating the user.

The OK button B12 is a button which receives an instruction to confirm an input operation by the user. The user selects the OK button B12 when the user wishes to confirm the input to the login user name input box Bx10 or the login password input box Bx12, or the user authentication destination that has been specified via the authentication destination specifying button B10. The cancel button B14 is a button which receives an instruction to cancel the input operation by the user.

Figure 7:
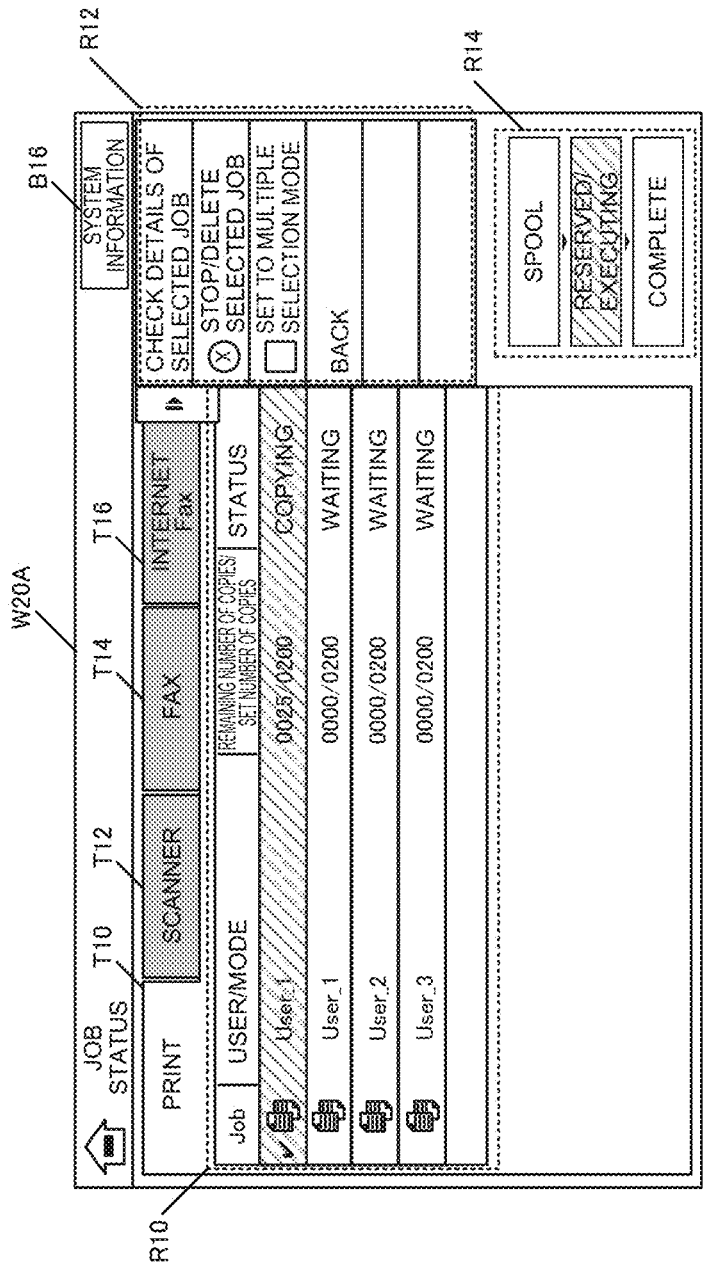
FIG. 7 is a diagram illustrating an operation example according to the first embodiment.

FIG. 7 is a diagram illustrating a configuration example of a "Reserved/Executing" screen W20A that is displayed by the controller 11 as the job list screen when the user authentication function is disabled and a job is being executed. FIG. 7 illustrates an operation example corresponding to processing of step S40 of FIG. 4.

The "Reserved/Executing" screen W20A includes a print job tab T10, a scanner job tab T12, a fax job tab T14, and an Internet Fax job tab T16, a job queue display area R10, an operation selection area R12, a status display area R14, and a system information display button B16.

The print job tab T10 is a tab which receives an instruction to display queues pertaining to a print job and a copy job. (A queue pertaining to each job may be hereinafter referred to as a job queue.) The scanner job tab T12 is a tab which receives an instruction to display a job queue pertaining to a scanner job. The fax job tab T14 is a tab which receives an instruction to display a job queue pertaining to a fax job. The Internet Fax job tab T16 is a tab which receives an instruction to display a job queue pertaining to an Internet Fax job. FIG. 7 illustrates an example in which the print job tab T10 is selected by the user, and the job queues pertaining to the print job and the copy job are displayed in the job queue display area R10, and the example is also a default screen to be displayed when the "Reserved/Executing" screen W20A is opened. In displaying the job queues, in order to clearly distinguish between the tab (job type) that has been selected by the user and tabs not selected by the user, a tab portion of the tabs not selected by the user may be displayed in a dark mode, as exemplified in FIG. 7.

The job queue display area R10 is an area where the job queues are displayed. When one of the print job tab T10, the scanner job tab T12, the fax job tab T14, and the Internet Fax job tab T16 is selected by the user, the controller 11 displays job queues of the job type represented by the selected tab. In doing so, the controller 11 acquires items necessary for display as the job queues from the job management table or the job history table exemplified in FIG. 3, and displays the acquired items in the job queue display area R10.

The job queue display area R10 exemplified in FIG. 7 includes, as display items, Job, User/Mode, Remaining number of copies/Set number of copies, and Status. Job indicates the job type pertaining to the job queue with an icon (an icon exemplified in FIG. 7 corresponds to a copy job). User/Mode indicates the name of a user who has given an instruction for job execution or a job mode for which the user is not identified (e.g., a job of making a small number of copies by directly operating the multifunction peripheral 10). Remaining number of copies/Set number of copies indicates the remaining number of copies out of the number of copies (printing) to be made. Status indicates the status of execution of the job.

FIG. 7 indicates that the job queue shown in the uppermost row pertains to a copy job executed by the user who is "User_1" in which the remaining number of copies is "25" with respect to the set number of copies "200", and the status is "copying". The operation example in FIG. 7 is an example of the case in which the user authentication function is disabled. Therefore, the controller 11 displays, in addition to the jobs executed (registered) by the user who is "User_1", the execution status (e.g., "waiting") of the jobs executed (registered) by users other than the aforementioned user "User_1" (i.e., User_2 and User_3) as the job queues in the order of registration of the jobs. Incidentally, as exemplified in FIG. 7, preferably, a job queue corresponding to a job being executed and the other job queues should be represented in different display modes (for example, by using different display colors or different fill patterns) so that the job being executed and the other jobs can be displayed distinguishably from each other.

As can be seen, if the user authentication function is disabled and a job is being executed, the controller 11 displays job queues corresponding to the jobs managed in the job management table in the order of registration of the jobs. The user can thereby easily ascertain the job being executed. Therefore, the user can easily ascertain the jobs that have been completed in the multifunction peripheral 10, and can simply carry out an operation again for a job using the executed job queue.

The operation selection area R12 is an area where input of an instruction for operation of the job queue displayed in the job queue display area R10 is received. For example, by selecting a job queue for which an operation is desired to be performed by placing a check mark thereon and specifying the item "Stop/Delete Selected Job" in the operation selection area R12, the job in the selected state can be stopped or deleted.

The status display area R14 is an area where the status of execution of the job is displayed. FIG. 7 exemplifies a job list screen pertaining to "Reserved/Executing" as the status of execution of the job, and thus the part related to "Reserved/Executing" is highlighted in the status display area R14.

The system information display button B16 is a button which receives an instruction to display a system information screen as a device information display screen. The system information screen will be described later.

Figure 8:
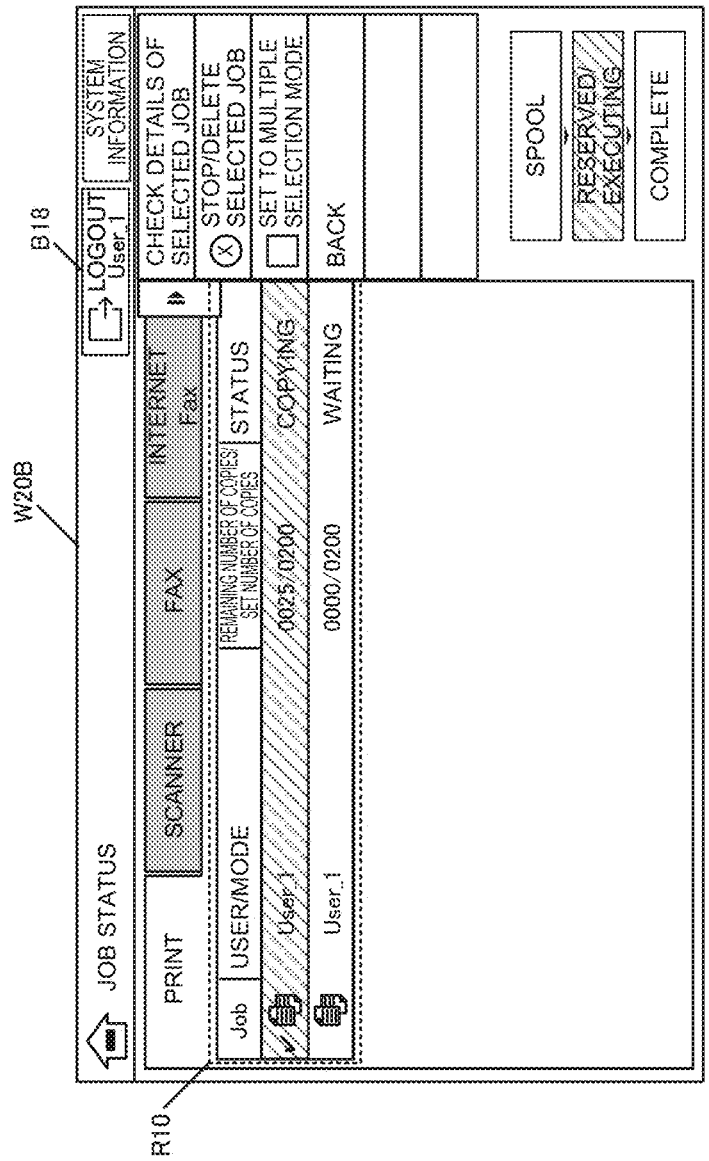
FIG. 8 is a diagram illustrating an operation example according to the first embodiment.

FIG. 8 is a diagram illustrating a configuration example of a "Reserved/Executing" screen W20B that is displayed by the controller 11 as the job list screen when the user authentication function is enabled and a job is being executed. FIG. 8 illustrates an operation example corresponding to processing of step S110 of FIG. 5.

The "Reserved/Executing" screen W20B displays, in addition to the configuration of the "Reserved/Executing" screen W20A, a logout button B18 which receives a logout instruction from the user who has logged into the multifunction peripheral 10. The logout button B18 displays the user name (User_1) of the user who has logged into the multifunction peripheral 10 (which may be hereinafter referred to as a login user), and thus the user logging into the multifunction peripheral 10 can be ascertained.

Further, the controller 11 displays only the job queues corresponding to the jobs registered by the login user (User_1) in the job queue display area R10 of the "Reserved/Executing" screen W20B. As can be seen, when a job is being executed, a job queue corresponding to the job being executed is displayed. Therefore, the login user can easily ascertain the job being executed. In addition, at this time, the controller 11 displays only the job queues corresponding to the jobs registered by the login user. Therefore, the login user can easily ascertain the status of execution of the jobs registered by the user himself/herself.

Figure 9:
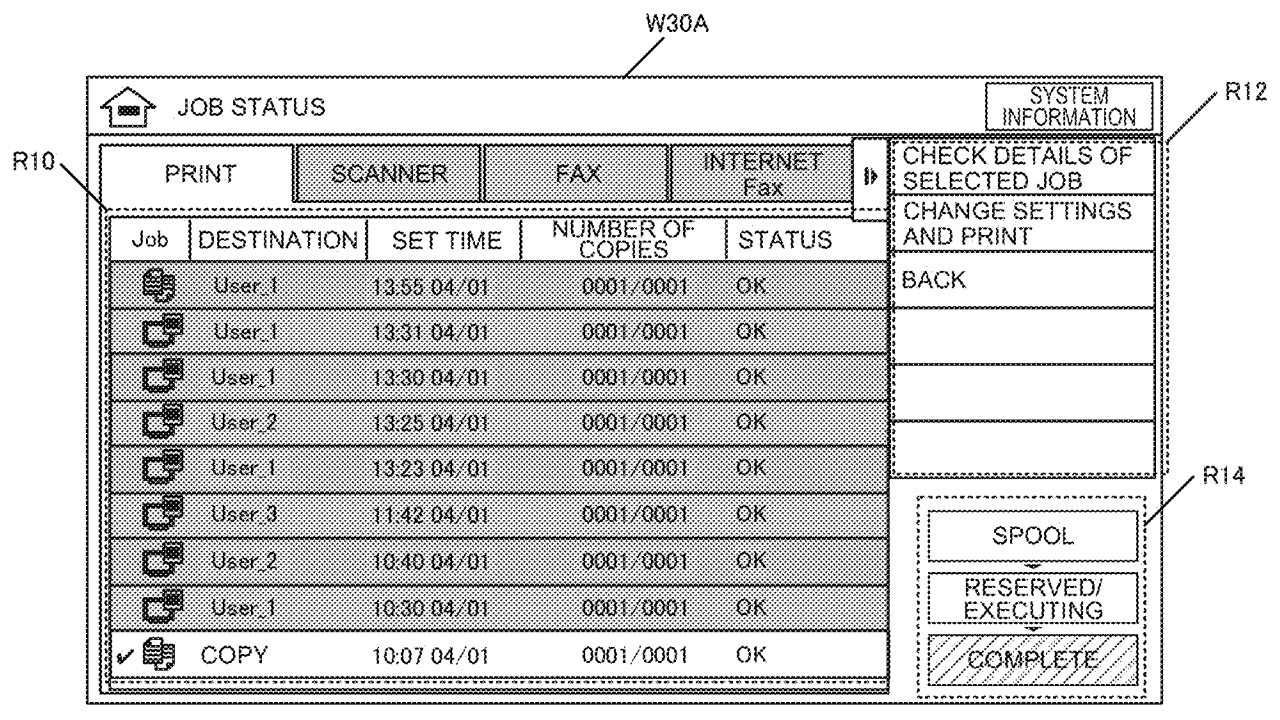

FIG. 9 is a diagram illustrating a configuration example of a "Complete" screen W30A that is displayed by the controller 11 as the job list screen when the user authentication function is disabled and no job is being executed, and when there exists no print job pertaining to a pre-registered encrypted PDF, and not a single print job is registered. FIG. 9 illustrates an operation example corresponding to processing of step S70 of FIG. 4.

A display configuration of the "Complete" screen W30A can be made the same as the configuration of the "Reserved/Executing" screen W20A, and thus the display configuration will not be described here.

Since the user authentication function is disabled in the above case, the job queue display area R10 related to FIG. 9 displays all of the job queues, which are registered as execution jobs in the multifunction peripheral 10 and managed in the job history table, in the order of registration. Therefore, the user can easily ascertain the jobs that have been completed in the multifunction peripheral 10, and can simply carry out an operation again for a job using the job queue pertaining to the executed job.

Figure 10:
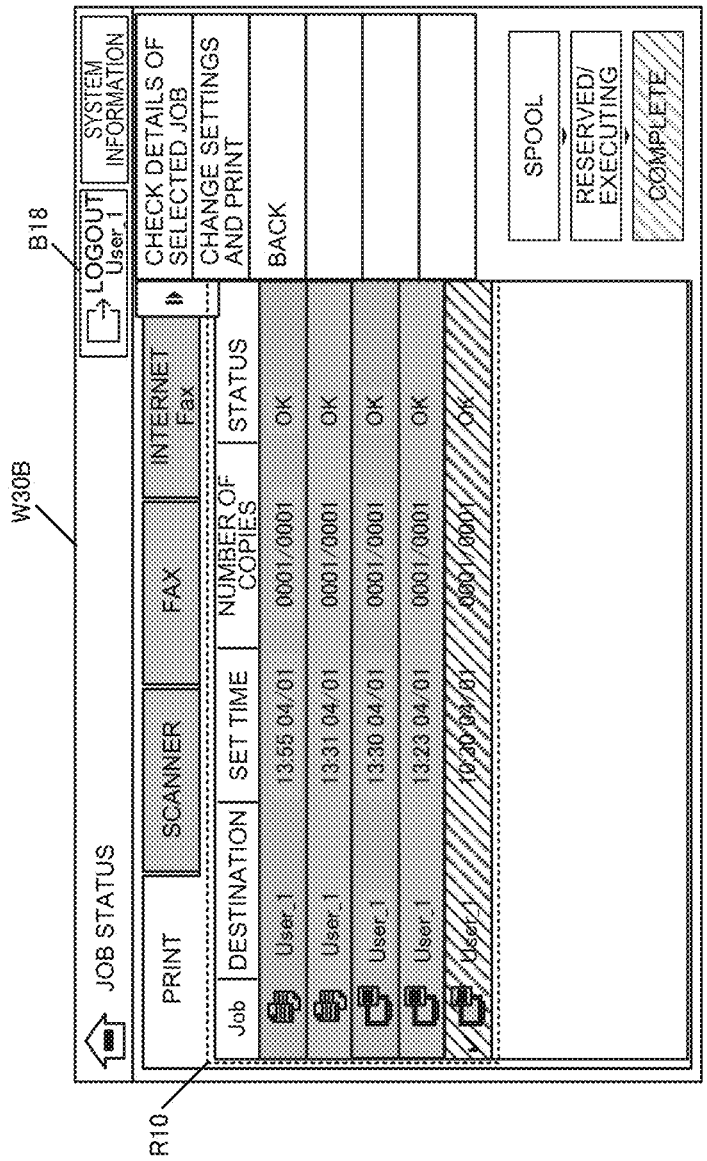
FIG. 10 is a diagram illustrating an operation example according to the first embodiment.

FIG. 10 is a diagram illustrating a configuration example of a "Complete" screen W30B that is displayed by the controller 11 as the job list screen when the user authentication function is enabled and no job is being executed, and when there exists no print job pertaining to a pre-registered encrypted PDF, and not a single print job is registered. FIG. 10 illustrates an operation example corresponding to processing of step S140 of FIG. 5.

A display configuration of the "Complete" screen W30B can be made the same as the configuration of the "Reserved/Executing" screen W20B, and thus the display configuration will not be described here.

Since the user authentication function is enabled in the above case, the job queue display area R10 related to FIG. 10 displays only the job queues corresponding to jobs that are registered by the login user and managed in the job history table. Therefore, the login user can easily ascertain the jobs of the login user that have been completed, and can simply carry out an operation again for a job using the job queue pertaining to the executed job.

Figure 11:
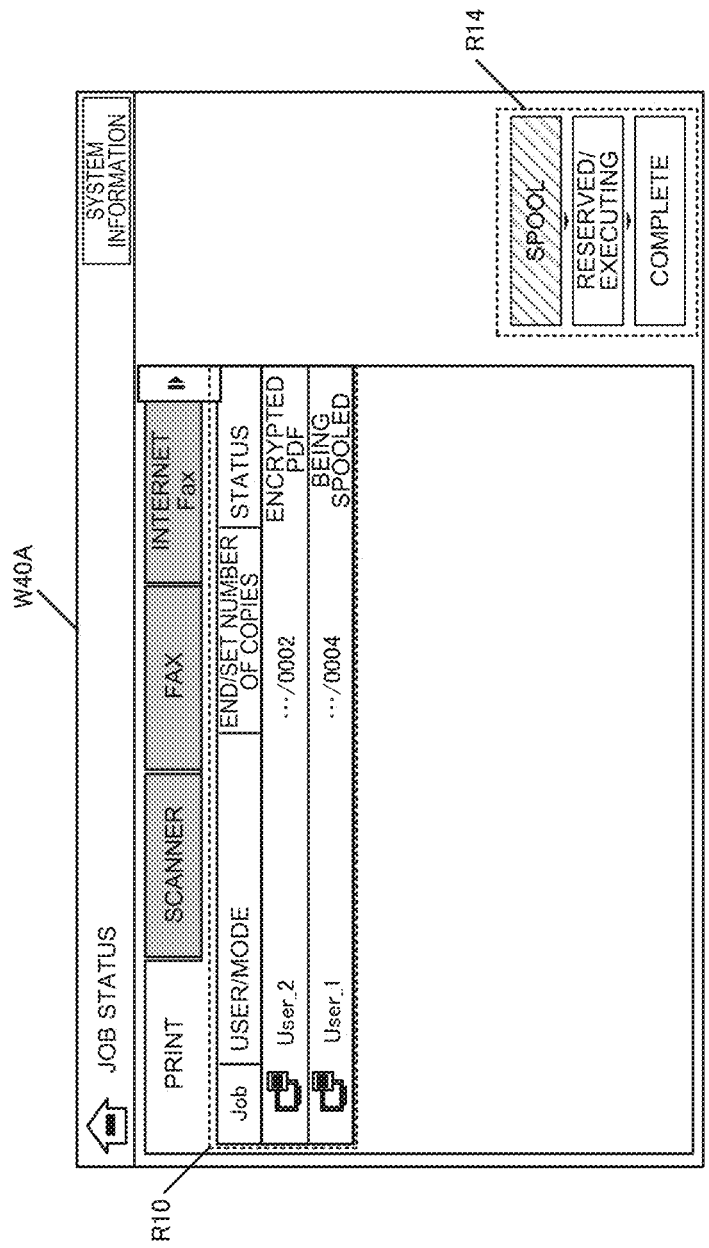
FIG. 11 is a diagram illustrating an operation example according to the first embodiment.

FIG. 11 is a diagram illustrating a configuration example of a "Spool" screen W40A that is displayed by the controller 11 as the job list screen when the user authentication function is disabled and no job is being executed, and when there exists a print job pertaining to a pre-registered encrypted PDF. FIG. 11 illustrates an operation example corresponding to processing of step S60 of FIG. 4.

A display configuration of the "Spool" screen W40A can be obtained by removing the operation selection area R12 from the configuration of the "Reserved/Executing" screen W20A, and thus the display configuration will not be described here.

Since the user authentication function is disabled in the above case, the job queue display area R10 related to FIG. 11 displays all of the job queues spooled in the multifunction peripheral 10 in the order of registration. At this time, when there exists a print job pertaining to a pre-registered encrypted PDF, a corresponding job queue is displayed on the "Spool" screen W40A. Therefore, the user can perform decryption processing or deletion processing for the encrypted PDF.

Figure 12:
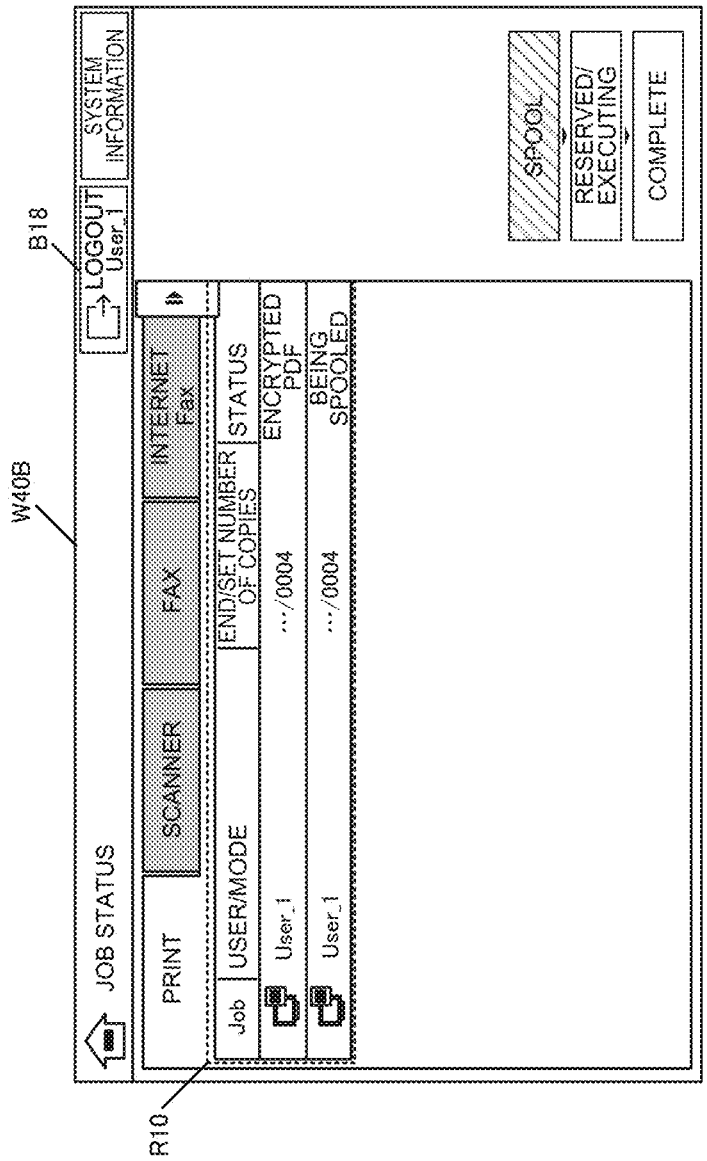
FIG. 12 is a diagram illustrating an operation example according to the first embodiment.

FIG. 12 is a diagram illustrating a configuration example of a "Spool" screen W40B that is displayed by the controller 11 as the job list screen when the user authentication function is enabled and no job is being executed, and when there exists a print job pertaining to a pre-registered encrypted PDF. FIG. 12 illustrates an operation example corresponding to processing of step S130 of FIG. 5.

A display configuration of the "Spool" screen W40B can be obtained by removing the operation selection area R12 from the configuration of the "Reserved/Executing" screen W20B, and thus the display configuration will not be described here.

Since the user authentication function is enabled in the above case, the job queue display area R10 related to FIG. 12 displays only the job queue of the job, which is registered by the login user as an execution job and is being spooled, and the job queue of a print job pertaining to an encrypted PDF. Therefore, the operation example of FIG. 12 has an advantage that there is no risk of the login user (User_1) accidentally manipulating the encrypted PDF registered in advance by another user.

As described above, according to the first embodiment, when user authentication is enabled, the display contents of a screen can be switched according to the status of execution of the job registered by the authenticated user. Consequently, it is possible to provide a job processing apparatus and the like which can display a job list screen at an appropriate timing according to the status of execution of the job, and by which the job list screen to be displayed is as desired by the user.

2. Second Embodiment

A second embodiment corresponds to an embodiment which displays, on a device information display screen on which pieces of device information are aggregated, the display contents of the job list display screen according to the first embodiment.

Since a functional configuration and a flow of processing of a multifunction peripheral according to the second embodiment can be made the same as those of the multifunction peripheral 10 according to the first embodiment, description thereof is omitted.

2.1 Operation Examples

Figure 13:
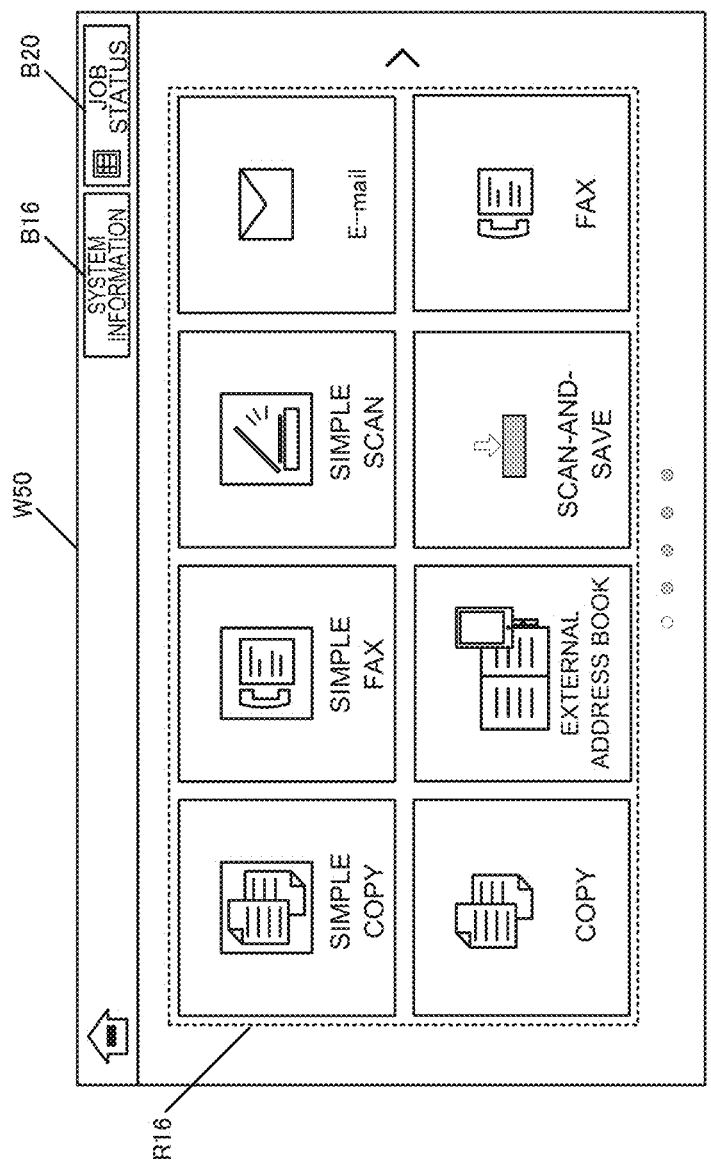
FIG. 13 is a diagram illustrating an operation example according to a second embodiment.

Operation examples according to the second embodiment will now be described. FIG. 13 is a diagram illustrating a configuration example of a home screen W50 which receives an instruction to display a system information screen as the device information display screen. The home screen W50 includes a device-function-and-the-like-selection button area R16, a system information display button B16, and a job status display button B20. The device-function-and-the-like-selection button area R16 includes input buttons indicating the settings and various kinds of information related to device functions such as image input/output, communication, job-related functions, or maintenance, using figures, characters/numbers, or symbols. In the example illustrated in FIG. 13, the device-function-and-the-like-selection button area R16 includes a simple copy button, a simple fax button, a simple scan button, an E-mail button, a copy button, an external address book button, a scan-and-save button, and a fax button. As the user selects the desired input button from among the aforementioned input buttons, a function based on the selected input button function can be executed.

The system information display button B16 is a button which receives input of an instruction to display a system information screen as the device information display screen, which will be described referring to the subsequent figure. When the input of the display instruction selected by the user is received, a controller 11 displays the system information screen on a display 13.

The job status display button B20 is a button which receives a display instruction to display a job list screen (e.g., a "Reserved/Executing" screen W20) exemplified in FIGS. 7 to 12, etc., of the first embodiment. When input of the display instruction selected by the user is received, the controller 11 displays, on the display 13, a job list screen according to the status of job execution.

Figure 14:
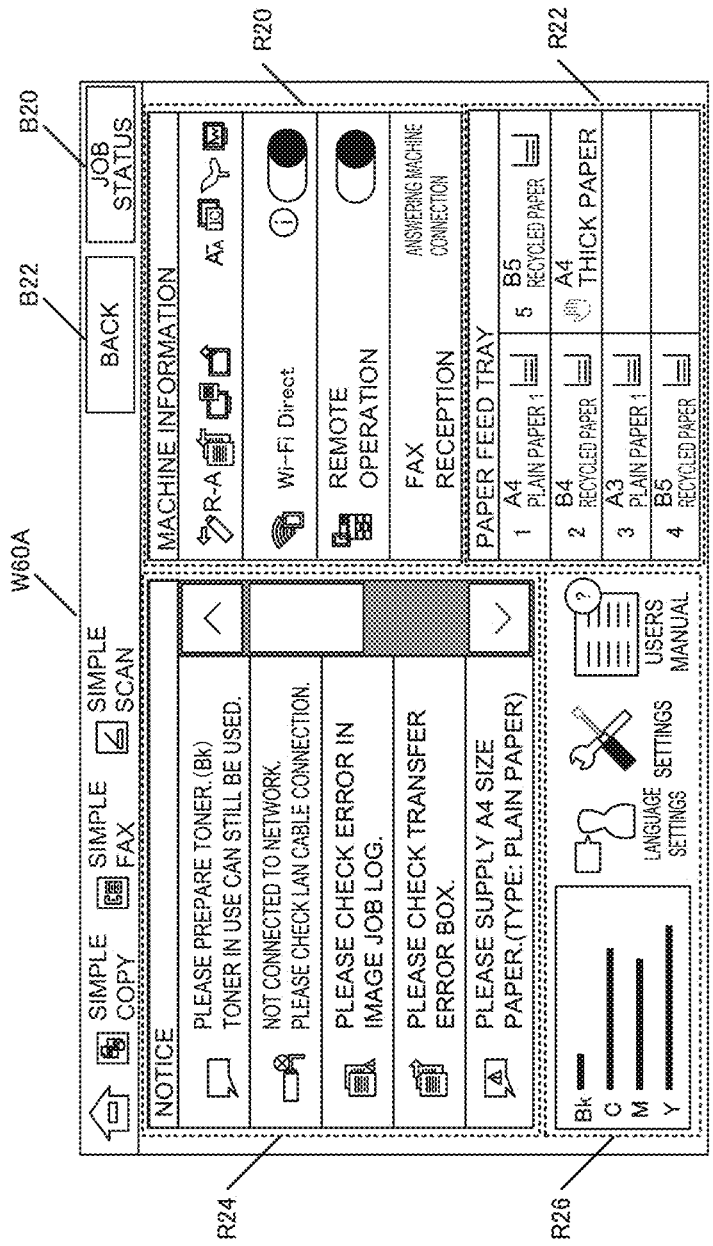
FIG. 14 is a diagram illustrating an operation example according to the second embodiment.

FIG. 14 is a diagram illustrating a configuration example of a system information screen W60A that the controller 11 displays on the display 13 when receiving input of a display instruction made by the user selecting the system information display button B16. The system information screen W60A can also be displayed by selecting the system information display button B16 provided on the job list screen (e.g., "Reserved/Executing" screen W20) exemplified in FIGS. 7 to 12, etc.

The system information screen W60A according to the example illustrated in FIG. 14 includes a machine information area R20 for displaying device state information relating to a multifunction peripheral 10 (i.e., machine information), a paper feed tray information area R22 for displaying information regarding the paper feed trays attached to the multifunction peripheral 10 (i.e., paper feed tray information), a notice information area R24 for displaying notice information to the user, and a device setting information area R26 for displaying the device settings and a toner level of the multifunction peripheral 10. For each display area, a header section (e.g., "Machine Information", "Paper Feed Tray"), for example, may be provided to identify the device information, as exemplified in FIG. 14. In addition, the system information screen W60A includes the job status display button B20 and a back button B22. The back button B22 is a button which receives an instruction to switch the display to the previously displayed home screen W50.

Figure 15:
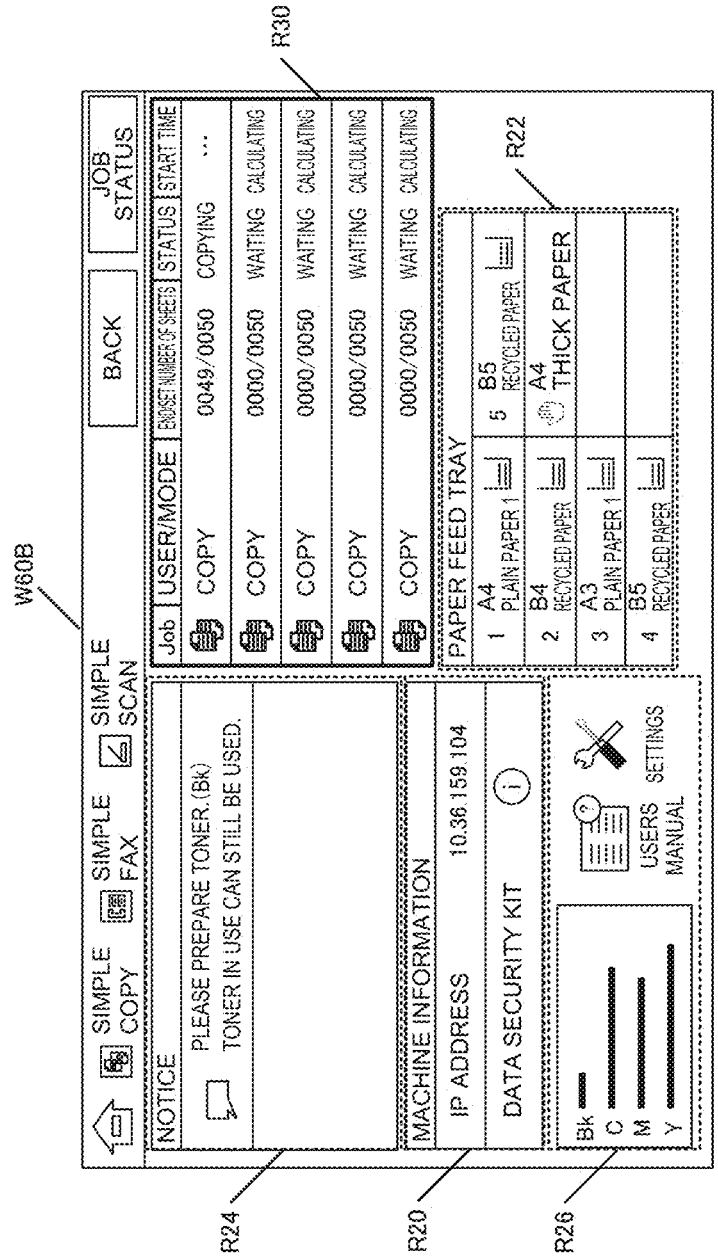
FIG. 15 is a diagram illustrating an operation example according to the second embodiment.

FIG. 15 is a diagram illustrating a configuration example of a system information screen W60B provided with a job list display area R30 for displaying the display contents of the job list screen exemplified in FIGS. 7 to 12, etc., within the display area of the system information screen W60A exemplified in FIG. 14. The setting of whether to enable or disable the display of the job list display area R30 over the system information screen W60A can be changed as appropriate through the system setting and the like.

In the system information screen W60B, the job list display area R30 is provided in the display area allocated as the machine information area R20 in the system information screen W60A exemplified in FIG. 14, and the machine information area R20 in question is moved to be displayed between the notice information area R24 and the device setting information area R26. The job list display area R30 shown in FIG. 15 is an example of displaying the display contents of the "Reserved/Executing" screen W20 exemplified in FIG. 7 or 8, etc. As can be seen, the job list display area R30 can display the display contents of the "Reserved/Executing" screen W20, "Complete" screen W30, or "Spool" screen W40, as exemplified in FIGS. 7 to 12, etc., according to the status of job execution.

As described above, according to the second embodiment, a job list display area for displaying the display contents of the job list screen exemplified in FIGS. 7 to 12, etc., is provided within the display area of the system information screen exemplified in FIG. 14. By virtue of this feature, it becomes possible to check on the device state relating to the multifunction peripheral (i.e., machine information), the amount of paper remaining in the paper feed tray (i.e., paper feed tray information) and the like simultaneously, and more flexible job management is enabled.

3. Third Embodiment

A third embodiment corresponds to an embodiment which enables, when execution of a job is detected, a "Reserved/Executing" screen W20 or a system information screen W60B, which displays the display contents of the aforementioned "Reserved/Executing" screen, to be displayed as a job list screen.

3.1. Functional Configuration

Figure 16:
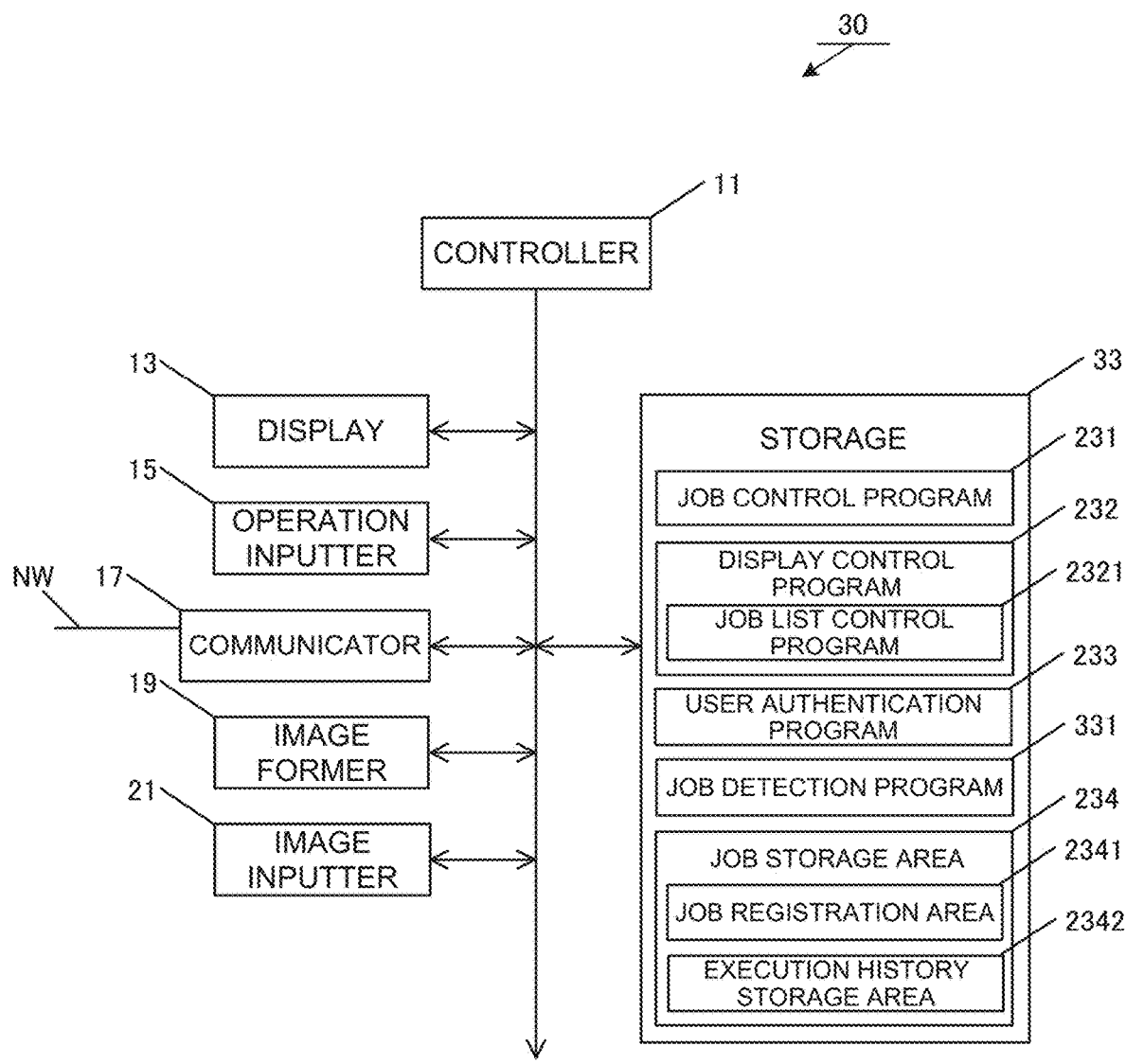
FIG. 16 is a functional configuration diagram of a multifunction peripheral according to a third embodiment.

FIG. 16 is a functional configuration diagram of a multifunction peripheral 30 according to the third embodiment. The multifunction peripheral 30 according to the third embodiment includes a storage 33 in place of the storage 23 of the multifunction peripheral 10 according to the first embodiment. Parts that can be configured the same as the multifunction peripheral 10 are denoted using the same reference numerals, and description thereof is omitted.

In the third embodiment, the storage 33 stores a job control program 231, a display control program 232, a user authentication program 233, and a job detection program 331, and reserves a job storage area 234.

The job detection program 331 is a program that a controller 11 reads when execution of a job related to each function of printing, copying, scanning, faxing, Internet Fax, and the like, is to be detected. The controller 11, which has detected execution of a job as a result of reading the job detection program 331, determines whether the detected job corresponds to a job ordered by a user (a walk-up user) who directly gives an instruction for job execution via an operation inputter 15 of the multifunction peripheral 30. Further, if it is determined that the detected job does not correspond to a job ordered by a walk-up user, the controller 11 reads the display control program 232 (a job list control program 2321) in order to control display of the "Reserved/Executing" screen W20 or the system information screen W60B which displays the display contents of the aforementioned "Reserved/Executing" screen.

3.2. Flow of Processing

Figure 17:
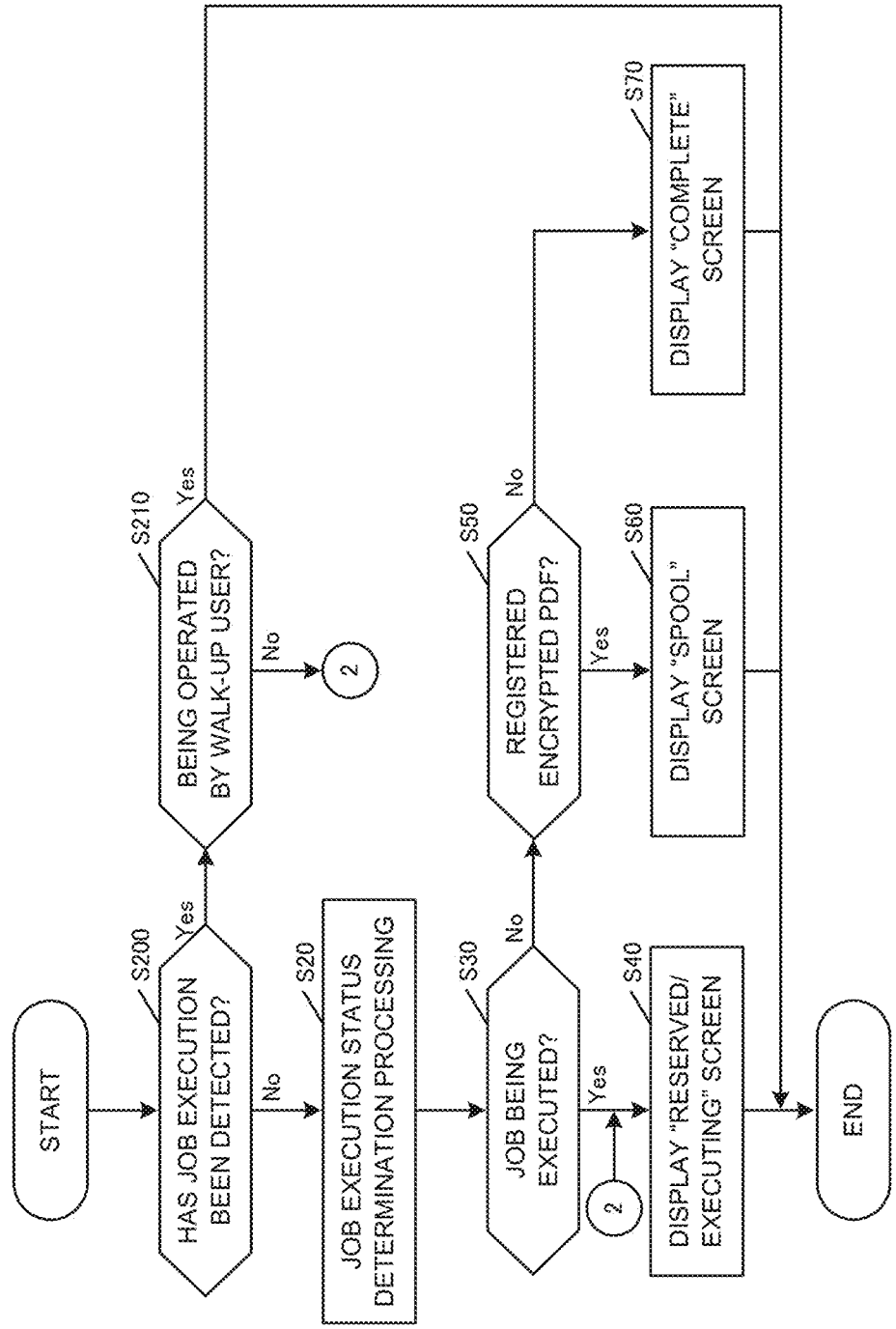
FIG. 17 is a flowchart illustrating a flow of processing according to the third embodiment.

Next, a flow of processing according to the third embodiment will be described with reference to a flowchart of FIG. 17. Processing that can be made the same as the processing described with reference to the flowchart of FIG. 4 of the first embodiment is denoted using the same step number, and description thereof is omitted.

First, the controller 11 which has read the job detection program 331 starts detection of job execution (step S200). When the controller 11 detects job execution, the controller 11 determines whether the detected job corresponds to a job ordered by a walk-up user (step S200; Yes→step S210). Meanwhile, if no job execution is detected, the controller 11 executes processing from step S20 to step S70 of FIG. 4 (step S200; No→step S20 to step S70).

If it is determined that the detected job corresponds to a job ordered by a walk-up user, the controller 11 ends the processing (step S210; Yes→End).

Meanwhile, if it is determined that the detected job does not correspond to a job ordered by a walk-up user, the controller 11 reads the display control program 232 (the job list control program 2321), displays the "Reserved/Executing" screen W20 or the system information screen W60B, which displays the display contents of the aforementioned "Reserved/Executing" screen, on a display 13, and ends the processing (step S210; No→step S40).

As described above, according to the third embodiment, it is possible to display, when execution of a job is detected, the "Reserved/Executing" screen W20 or the system information screen W60B, which displays the display contents of the aforementioned "Reserved/Executing" screen, as the job list screen without selecting a system information display button or a job status display button, etc., provided on a home screen, for example. Therefore, the third embodiment can reduce an operation burden on the user. Further, when the detected execution job corresponds to a job ordered by a walk-up user, the controller restricts the display of the job list screen or the system information screen. Thus, the third embodiment does not have the risk of affecting an operation by the walk-up user.

The present disclosure is not limited to the above-described embodiments, and various changes can be made. That is, embodiments obtained by combining technical measures modified as appropriate within a range that does not depart from the gist of the present disclosure are also included in the technical scope of the present disclosure.

Although some parts of the above-described embodiments are separately described for convenience of explanation, it is needless to say that the embodiments may be combined and implemented within a technically allowable range.

Further, the program to be operated on each of the devices in the embodiments is a program that controls the CPU or the like (a program that makes a computer function) so as to implement the functions of the above-described embodiments. The embodiments assume a device in which a plurality of programs are executed simultaneously as needed by multitask processing. The information handled by the devices is temporarily accumulated in a temporary storage device (for example, a RAM) during processing of the information, and then, is stored in various storage devices such as a read-only memory (ROM) and an HDD, and is read, modified, and written by the CPU as necessary.

A recording medium used for storing the program may be any one of a semiconductor medium (for example, a ROM, a non-volatile memory card, or the like), an optical recording medium or a magnetooptical recording medium (for example, a digital versatile disc (DVD), a magnetooptical disc (MO), a mini disc (MD), a compact disc (CD), a Blu-ray® disc (BD), or the like), and a magnetic recording medium (for example, a magnetic tape, a flexible disk, or the like). Moreover, not only are the functions of the embodiments described above implemented by execution of a loaded program, but the functions of the present disclosure may also be implemented by processing performed in cooperation with an operating system or other application programs, etc., on the basis of an instruction of the program.

Furthermore, in a case where the programs are to be distributed to the market, the programs may be stored in a portable recording medium for distribution or transferred to a server computer connected via a network, such as the Internet. In this case, a storage device of the server computer is also included in the present disclosure as a matter of course.

What is claimed is:

1. A job processing apparatus comprising:
   one or more controllers which control execution of a registered job; and
   a display which allows a status of the execution of the registered job to be displayed on a screen, wherein
   the one or more controllers control to:
      determine the status of the execution of the registered job, and automatically switch the screen to be displayed on the display according to the determined status of the execution of the registered job,
      display the status of the execution of the registered job on the screen when the registered job is being executed,
      display a history of the execution of the registered job on the screen when the execution of the registered job is completed, and
      display a spool screen when a user authentication function is disabled and a specific job that has been registered is a print job of an encrypted portable document format (PDF).

2. The job processing apparatus according to claim 1, further comprising an authenticator which authenticates a user when the user authentication function is enabled, wherein
   when the user authentication function is enabled, the one or more controllers further control to switch display contents of the screen according to the status of the execution of the registered job that is registered by the authenticated user.

3. The job processing apparatus according to claim 2, wherein
   when the user authentication function is enabled, the one or more controllers further control to restrict the display of the screen of the status of the execution of the registered job that is registered by a user other than the authenticated user.

4. The job processing apparatus according to claim 2, wherein
   when the user authentication function is disabled, the one or more controllers further control to display the status of the execution of the registered job on the screen according to an order of registration of a plurality of jobs, including the registered job.

5. The job processing apparatus according to claim 1, wherein
   when the user authentication function is enabled and the specific job that has been registered by a user other than an authenticated user is the print job of the encrypted PDF, the one or more controllers display the spool screen after authenticating the user other than the authenticated user.

6. The job processing apparatus according to claim 1, wherein:
   the display further allows a device information display screen on which pieces of device information are aggregated to be displayed, and
   the one or more controllers further control to display, on the device information display screen, display contents of the screen.

7. A job processing apparatus comprising:
   one or more controllers which control execution of a registered job;
   a job detector which detects the execution of the registered job; and
   a display which allows a status of the execution of the registered job to be displayed on a screen, wherein
   the one or more controllers control to:
      determine the status of the execution of the registered job based on a result of the detection of the execution of the registered job,
      automatically switch display contents of the screen according to the status of the execution of the registered job, and
      display a spool screen when a user authentication function is disabled and a specific job that has been registered is a print job of an encrypted portable document format (PDF).

8. The job processing apparatus according to claim 7, wherein
   when the job detector has detected the execution of the registered job, and a user is operating the job processing apparatus, the one or more controllers further control to restrict the display of the screen.

9. A display method comprising:
   controlling execution of a registered job;
   displaying a status of the execution of the registered job on a screen;
   determining the status of the execution of the registered job, and automatically switching the screen to be displayed on the display according to the determined status of the execution of the registered job;
   displaying the status of the execution of the registered job on the screen when the registered job is being executed;
   displaying a history of the execution of the registered job on the screen when the execution of the registered job is completed; and
   displaying a spool screen when a user authentication function is disabled and a specific job that has been registered is a print job of an encrypted portable document format (PDF).

* * * * *